US 6,537,008 B1

(12) United States Patent
Haring

(10) Patent No.: US 6,537,008 B1
(45) Date of Patent: Mar. 25, 2003

(54) MULTI-USE FARM TRAILER

(76) Inventor: Clay A. Haring, 1323 N. 108th Rd., Lincoln, KS (US) 67455

( * ) Notice: Subject to any disclaimer, the term of this patent is extended or adjusted under 35 U.S.C. 154(b) by 0 days.

(21) Appl. No.: 09/992,857

(22) Filed: Nov. 6, 2001

(51) Int. Cl.$^7$ ................................................. A01D 90/10
(52) U.S. Cl. .................... 414/24.5; 298/18; 414/470
(58) Field of Search .................... 298/17.5, 17.6, 298/17.7, 18; 414/24.5, 24.6, 111, 470

(56) References Cited

U.S. PATENT DOCUMENTS

| | | | | |
|---|---|---|---|---|
| 2,739,836 A | * | 3/1956 | Kilpatrick | 298/18 |
| 4,092,050 A | * | 5/1978 | Sobeck | 298/18 |
| 4,106,812 A | * | 8/1978 | Clark | 298/1 B |
| 4,453,761 A | * | 6/1984 | Felburn | 296/43 |
| 4,500,242 A | * | 2/1985 | Beikman | 414/24.5 |
| 4,580,843 A | * | 4/1986 | Lund | 298/18 |
| 5,076,752 A | | 12/1991 | Rader | |
| 5,180,271 A | | 1/1993 | Farden | |
| 5,277,537 A | | 1/1994 | Druse | |
| 5,340,259 A | | 8/1994 | Flaskey | |
| 6,068,434 A | * | 5/2000 | Vankooten | 414/24.5 |
| 6,152,536 A | | 11/2000 | Krinhop | |

* cited by examiner

Primary Examiner—Janice L. Krizek
(74) Attorney, Agent, or Firm—Edward L. Brown, Jr.

(57) ABSTRACT

A multiple use farm trailer for transporting large round hay bales in one configuration and rectangular hay bales or farm machines in another; the trailer includes a multiple-section deck with a stationary center section, two inner deck sections which pivot upward about a longitudinal axis, a locking leg of each inner deck section for retaining the inner deck section elevated at an angle to the plane of the deck, attached to each side of the deck is a side wall pivotally mounted to the deck whereby the elevated inner deck sections and their adjacent side walls in their raised positions form a cradle for support of a row of round hay bales. The pivoting side walls include linear actuating means for lowering the side walls and rolling the hay bales off the trailer.

5 Claims, 3 Drawing Sheets

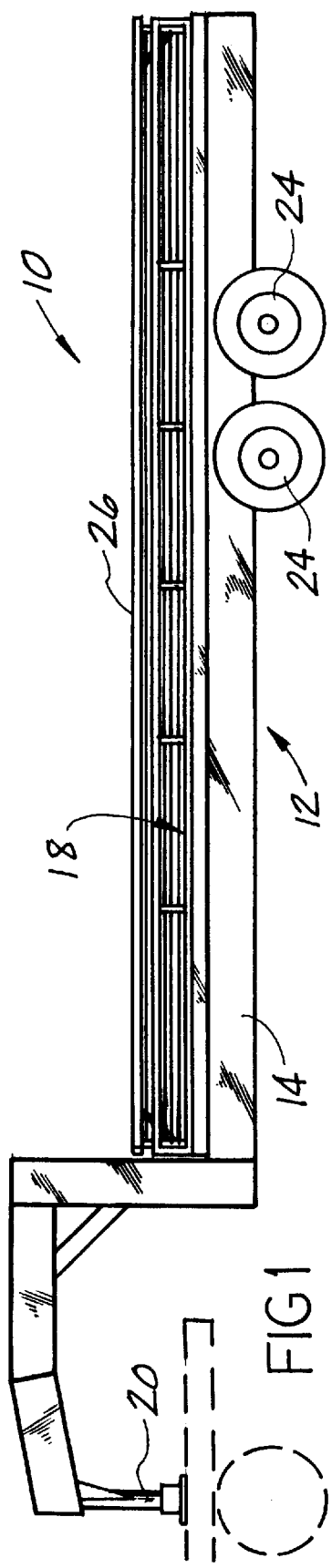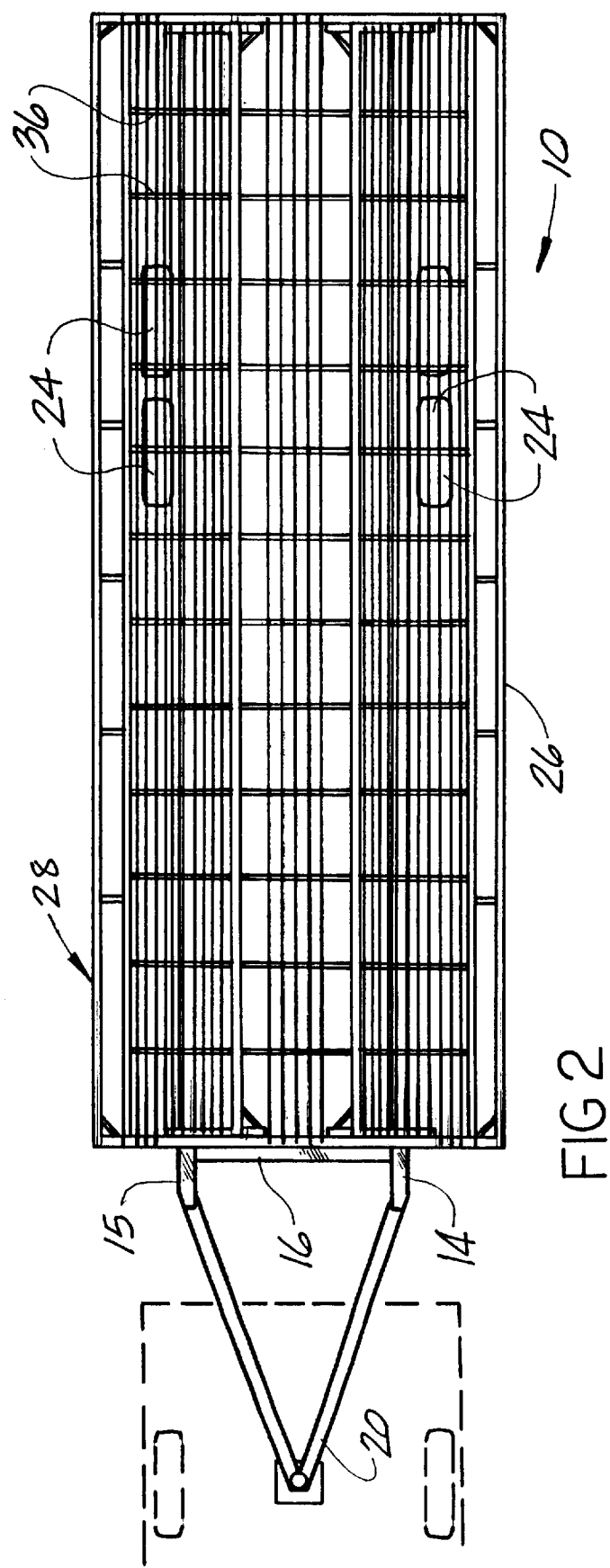

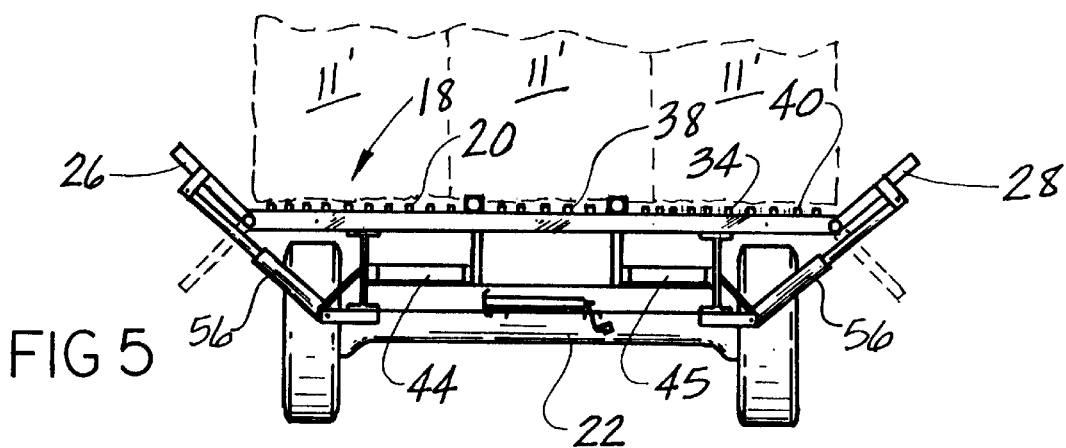
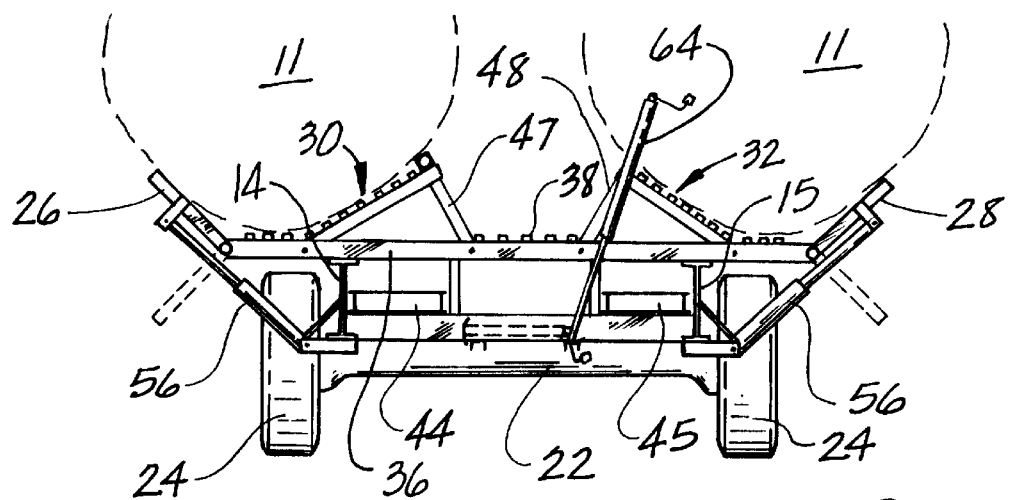
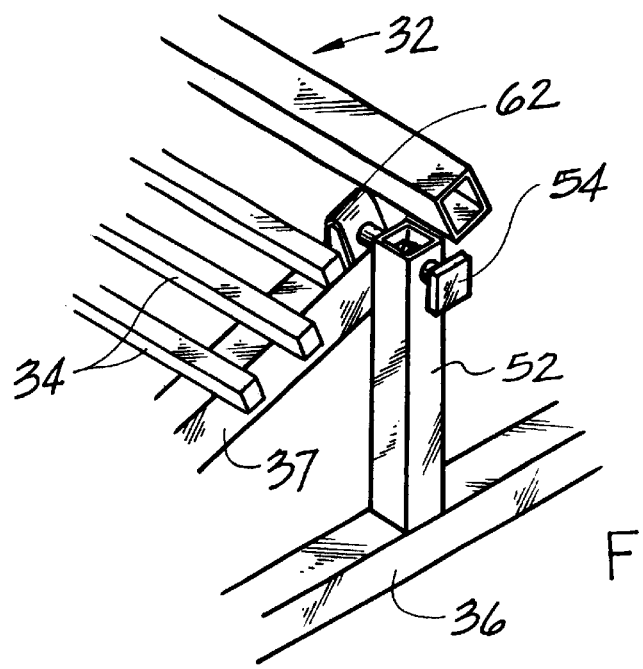

MULTI-USE FARM TRAILER

BACKGROUND OF THE INVENTION

1. Field of Invention

This invention relates generally to farming equipment and more specifically to a multi-purpose farm trailer that can transport and unload large round hay bales or in its flat condition can transport rectangular bales or farm machinery.

2. Description of the Prior Art

Modern day farming requires an assortment of machines for performing a variety of tasks and it is desirable to have machines that have multiple functions. Farming today requires trailers that can haul hay bales and farm machinery legally on the highways.

With the advent of the large round hay bales that cannot be manually lifted, there is the additional requirement of a loader which lifts the 1,000 to 1,500 pound round bales for placement on a wagon or trailer that transports the bales to a storage location. Round bales are typically stored with the axis of the bale horizontal just as they are dropped by the bailer in the field. They are usually transported on trailers one or two rows wide, with each bale end to end to the next bale. The farmer must make a second trip to and from the field to bring the loader to the storage facility to unload or they must have a second loader located at the storage facility. A hay wagon which will unload the bales without the assistance of a loader, eliminates the need for a loader at the storage facility. In prior times hay wagons were typically small and carried a limited number of bales thus requiring many trips from the field to the storage facility. Large round bales require special support surfaces on wagons when transporting such as cradles which prevent them from rolling off the wagon. Current hay trailers such as the present invention can be towed by pickup trucks rather than farm tractors and are capable of carrying much heavier loads due to their size, thus reducing the number of trips from the field to the storage facility.

The concept of bale carriers which self-eject is not new as taught in the patents to Rader, U.S. Pat. No. 5,076,752; Druse, U.S. Pat. No. 5,277,537; Farden, U.S. Pat. No. 5,180,271; and Flaskey, 5,340,259. The last mentioned patent to Flaskey also provides apparatus on the trailer for loading the bales, as well as unloading them. The patent to Druse teaches a large capacity trailer which ejects single bales at a time. The patent to Farden teaches a mechanical latching device which releases a full row of bales or two rows if piled three high.

The patent to Rader teaches a wagon which is suitable for hauling round bales and unloading the bales, and, lastly, provides a configuration for feeding the hay off the wagon as a feed bunk. Like most of the other unloading structures in the above-mentioned patents, Rader drops one wing in a cradle configuration allowing the bale to roll off the wagon.

Round bale trailers must be operable over roadways as well as in the field and therefore must comply with the rules and regulations applicable to trailers that move on public roadways. Round bale handling apparatus comprises a variety of different methods and structures, such as those that squeeze the ends on both sides before lifting; others spear the center of the bales, and others extend a fork underneath the bale in a typical forklift configuration. Whatever the handling apparatus is, requires a substantial structure and machine for lifting and then transporting a half-ton bale of hay. A typical arrangement would be a farm tractor with a loader on its front end.

SUMMARY OF THE INVENTION

The bale carrier trailer of the present invention carries and unloads round bales as well as large rectangular bales when the trailer is in its flat bed configuration. This permits the farmer to utilize the same trailer for various types and sizes of bales. In its flat bed configuration, the trailer can also transport farm machinery which are driven up a pair of ramps stored under the bed of the trailer. When the operator decides to haul large round bales, he merely manually elevates the inner deck sections of the trailer to their elevated angular position providing two rows of a cradle along with the pivotally mounted side walls of the trailer.

It is therefore the principal object of the present invention to provide a hay bale trailer which transports both round and rectangular bales.

Another object of the present invention is to provide a round bale trailer which can quickly be modified to a conventional flat bed trailer for hauling various farm machines or any other material.

Another object of the present invention is to provide a multiple use farm trailer which is approved for highway transportation.

BRIEF DESCRIPTION OF THE DRAWINGS

Referring to the figures wherein the like numerals represent like parts and the various views:

FIG. 1 is a side elevational view of the farm trailer with the side walls and the inner deck sections in their elevated round bale loading position;

FIG. 2 is a top plan view also in the round bale loading position;

FIG. 5 is a rear end elevational view of the trailer in its flat bed configuration;

FIG. 6 is a rear end elevational view of the trailer with the side walls and inner deck sections elevated for the round bale transport configuration;

FIG. 7 is a partial isometric view of the inner deck latching structure in the elevated position.

DETAILED DESCRIPTION OF THE INVENTION

Figure 3:
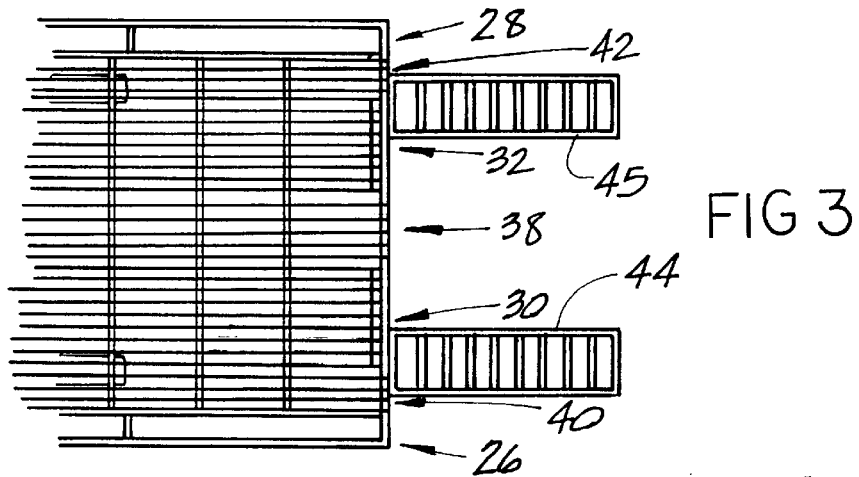
FIG. 3 is a partial top plan view of the trailer in its flat bed configuration with its loading ramps in position.

In FIGS. 1 and 2 of the. drawings, the multi-use farm trailer of the present invention is generally identified by reference numeral 10. The trailer 10 has a frame 12 constructed of longitudinal beams 14 and 15 and lateral cross beams 16. The frame 12 supports a steel deck having multiple sections which will later be described in detail. The trailer 10 has a conventional gooseneck trailer hitch 20 and the trailer is supported on a pair of axles 22 which in turn support single or dual wheels 24.

Figure 4:
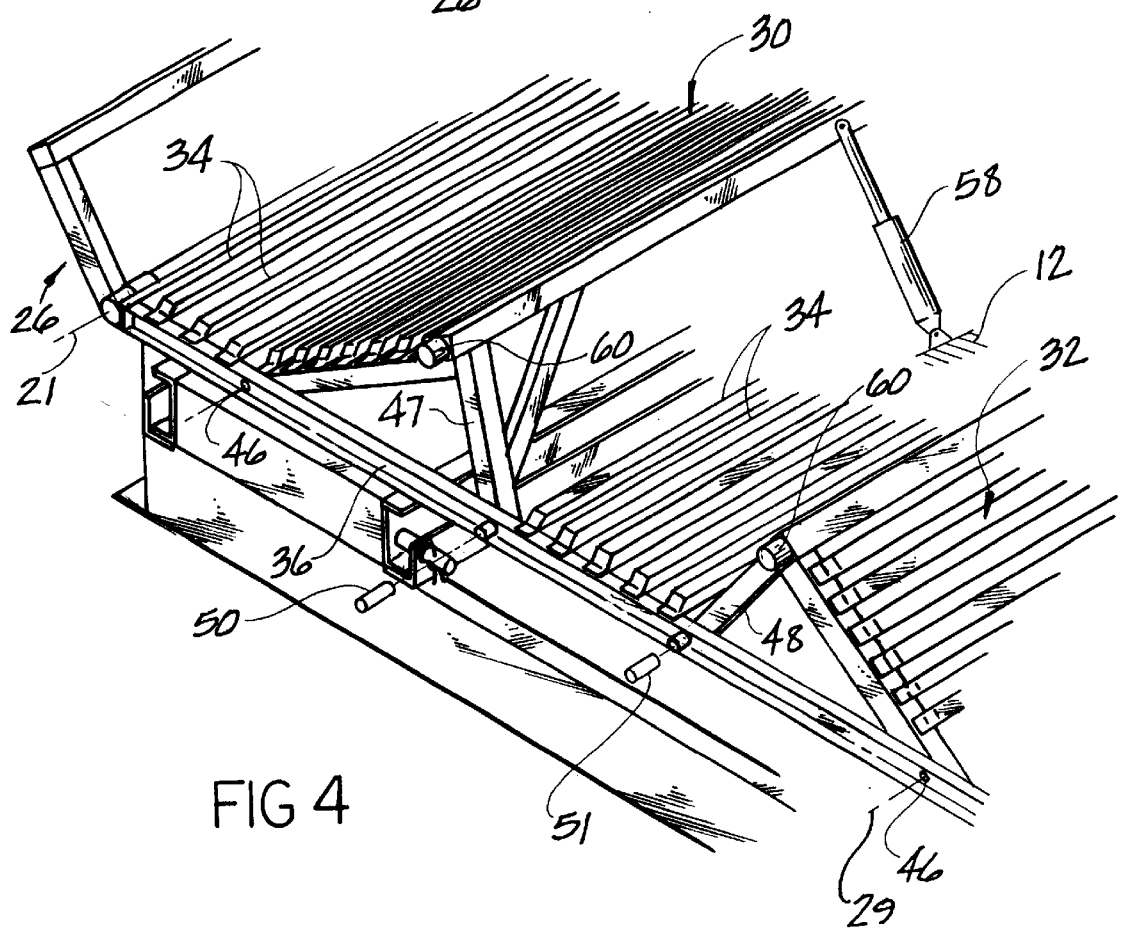
FIG. 4 is a partial isometric view of the deck of the trailer in its round bale loading position.

The deck 18, as seen in FIGS. 4, 5 and 6, is made up of a plurality of fixed and movable sections. Center section 38, located in the center of the bed, is stationary and is surrounded on both sides by inner deck sections 30 and 32, which sections 30 and 32 are pivotally mounted about horizontal axis 27 and 29, respectively, as seen in FIG. 4. Located just outwardly of inner deck sections 30 and 32 are stationary outer deck sections 40 and 42 which extend out to the edge of the deck 18 as seen in FIGS. 3 and 4. Attached to the outer edges of the deck are a pair of side walls 26 and 28 which pivotally attach the deck 18 about axis 21 as seen in FIG. 4. Side walls 26 and 28 in their elevated positions, as seen in FIGS. 4 and 6, provide half of the cradle which supports the round bales 11, as seen in FIG. 6. Side walls 26 and 28 are each connected to a pair of single or double acting hydraulic cylinders 56, as shown in FIG. 6, which can move the side walls 26 and 28 from their bale supporting position in FIG. 6 to their dotted line dumping position. The two hydraulic cylinders on side wall 26 are remotely controlled by a small self-contained hydraulic power pack electrically powered which are well-known in the art, and therefore are not shown in detail. The cylinders 56 could be double acting and plumbed to move in place with each other by a well-known on-off hydraulic circuit. Separate hydraulic valves in the power pack separately control the right and left side walls 28 and 26, respectively, permitting the operator to dump the bales on the right or left side at the operator's choice.

The pivotally mounted inner deck sections 30 and 32 are shown in their elevated locked position in FIG. 4. Inner deck section 30 includes one or more fixed legs 47 extending downwardly therefrom which is pinned to lateral member 36 by a removable pin 50. The opposite end of inner deck section 30 is held in its elevated position by a stationary leg 52, as shown in FIG. 7. Leg 52 is welded to lateral member 36 and includes a spring biased self locking pin 54 which engages a lock strike 62 as inner deck section 32 is raised to its elevated position.

The various sections deck 40, 30, 38, 32 and 42 are all constructed of spaced box section tubing 34 which lies longitudinally along the deck and is welded to lateral tubing 36 and 37.

A pair of ramps 44 and 45 are located in longitudinal pockets in the trailer, as seen in FIGS. 5 and 6, which can be withdrawn and placed on the back edge of the ramp for loading various farm machines, as seen in FIG. 3.

The pivoting inner deck sections 30 and 32 in the horizontal position are supported by lugs 60 which rest on lateral members 36. Sections 30 and 32 have substantial weight and therefore require some assistance when they are manually elevated to the round bale position of FIG. 6. This manual assistance can be of various types such as a jack 64, as shown in FIG. 6, or an air shock 58, symbolically shown in FIG. 4.

OPERATION

When the trailer 10 is hauling rectangular hay bales or farm machinery, it is configured in its FIG. 3 and FIG. 5 position.

When the trailer 10 is hauling round bales, the inner deck sections 30 and 32 are elevated about their pivotal axes 27 and 29. This elevation can be achieved manually with the assistance of a jack 64 or an air shock 58 which reduces the necessary lifting force into its locked position, as shown in FIG. 7. As deck section 32 is elevated, lock strike 62 cams spring bias locking pin 54 in a retracted position until pin 54 aligns with the opening in lock strike 62 whereupon section 32 is locked in place. The rear end of inner deck sections 30 and 32 are further locked in place as locking pins 50 and 51 are inserted in openings in the ends of legs 47 and 48, as seen in FIG. 4.

When it is desirous to unload bales 11, a remote hydraulic valve is actuated, opening the hydraulic cylinder 56 to reservoir whereupon the weight of bale 11 on side walls 26 and 28 will cause the side walls to retract to their dotted line positions allowing the bale to roll to the ground.

With the trailer in its flat bed configuration, as shown in FIG. 5, it can carry three rows of large rectangular bales, as illustrated in FIG. 5. While side walls 26 and 28 are each disclosed as a unitary structure, they also could be configured with separate multiple end walls each being the width of a round bale so that they could be unloaded one at a time rather than all of the bales on one side at a time. The side walls could be actuated by a mechanical latching means rather than hydraulic cylinders 56.

Since various modifications can be made to the invention as herein above described within the spirit and scope of the present invention, it is intended that all matter contained in the accompanying specification shall be interpreted as illustrative and not in a limiting sense.

What is claimed is:

1. A multiple use farm trailer including a frame having longitudinal and lateral members supported upon at least one axle, a hitch attached to the front of the frame, a multiple section deck lying in a common plane supported by the frame:

a pair of side walls pivotally mounted to the deck between a raised and lowered position about a horizontal pivoting axis, one on each side of the deck;

releasable means holding each side wall in a raised position;

the deck including a stationary center section extending longitudinally along the trailer;

a pair of inner deck sections having inner and outer edges, one inner deck section on each side of the center section, the inner deck sections each being pivotally mounted to the deck about a horizontal axis along their outer edges;

at least one locking leg on the inner edge of each inner deck section for retaining each section elevated at an angle to the plane of the deck, the elevated inner deck sections and their adjacent side walls in their raised positions form a cradle for support of a row of round hay bales.

2. A multiple use farm trailer, as set forth in claim 1, wherein the multiple section deck further includes a pair of stationary outer deck sections, each outer deck section is positioned between an inner deck section and the pivoting axis of a side wall.

3. A multiple use farm trailer, as set forth in claim 1, including biasing means mounted on the frame and attached to the inner deck sections applying a lifting force to the pivotally mounted inner deck sections for assistance in manually raising and lowering the inner deck sections.

4. A multiple use farm trailer, as set forth in claim 1, further including a pair of stationary legs mounted on the front portion of the trailer frame adjacent each inner deck section; locking latch means mounted on each stationary leg for engaging and latching a respective inner deck section as the inner deck sections are elevated to their raised positions in locking engagement.

5. A multiple use farm trailer, as set forth in claim 1, wherein the various deck sections comprise spaced box section tubing integrally welded to lateral box section tubing.

* * * * *